(No Model.)
L. KING.
CAR COUPLING.
No. 254,984. Patented Mar. 14, 1882.
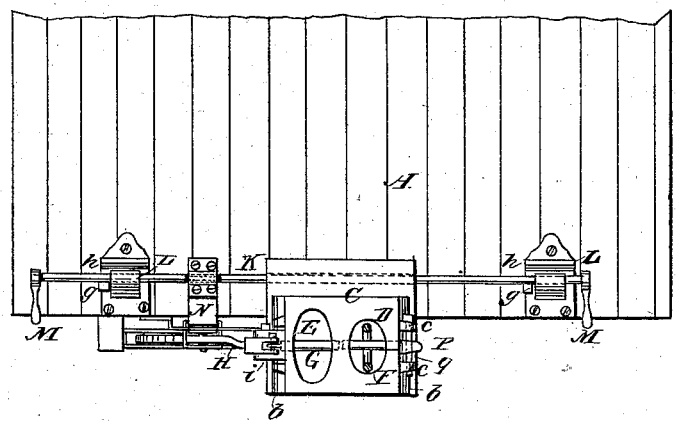
Fig. 1.
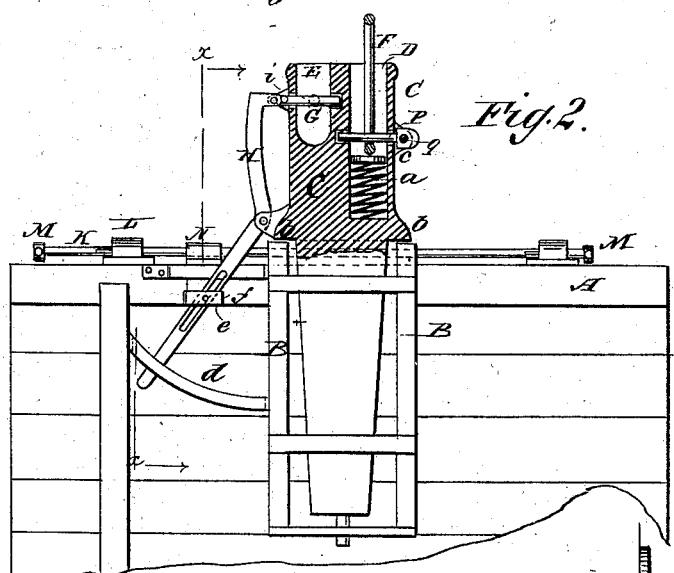
Fig. 2.
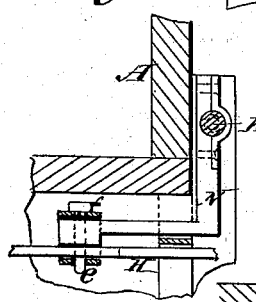
Fig. 4.
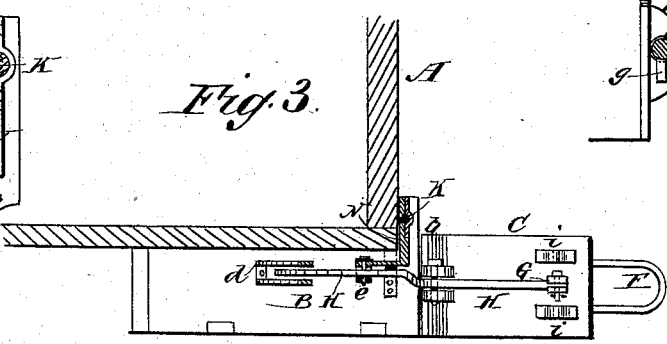
Fig. 5.
Fig. 3.
WITNESSES:
Francis McArdle
C. Sedgwick
INVENTOR:
L. King
BY Munn & Co
ATTORNEYS.
N. PETERS, Photo-Lithographer, Washington, D. C.

UNITED STATES PATENT OFFICE.

LEANDER KING, OF GEORGETOWN, OHIO.

CAR-COUPLING.

SPECIFICATION forming part of Letters Patent No. 254,984, dated March 14, 1882.

Application filed January 7, 1882. (No model.)

*To all whom it may concern:*

Be it known that I, LEANDER KING, of Georgetown, Brown county, Ohio, have invented a new and Improved Car-Coupler, of which the following is a full, clear, and exact description.

My invention consists in certain features of construction in couplings fitted for operation from the side of the car, having the object to obtain reliable working, as hereinafter described and claimed.

Reference is to be had to the accompanying drawings, forming part of this specification, in which similar letters of reference indicate corresponding parts in all the figures.

Figure 1 is an end elevation of a car fitted with my improved couplings. Fig. 2 is an inverted plan view of the car with the draw-head in section. Fig. 3 is a sectional side view on line $x\ x$ of Fig. 2. Figs. 4 and 5 are detail views.

A is the end of an ordinary freight-car; B, timbers forming guides and support for the draw bar and head. The draw-head C is formed with two compartments, D E, side by side, the former being the deeper, and fitted in its bottom with a spiral spring and follower, $a$. The compartment D also contains a link, F, held by a bolt, P, entering through the side of the draw-head, which link is to remain permanently protruding for entering the compartment E of an opposing draw-head, and when thus coupled the compartment E of the represented car usually receives, without fastening, the link of the opposing car. The link F is forced against the pin P by the spring $a$, and is thus retained in a horizontal position, and the spring allows the link to give way to shock, and thus prevents the breaking of the link or pin, which might occur if the link were rigid. The pin P is locked by a cross-pin, $q$, passing through its end, and lugs $c$ on the side of the head.

The draw-head C is formed with shoulders $b\ b$, that take against the timbers B, so that the head is sustained against backward pressure. In the shoulders $b$ at one side is pivoted a bent lever, H, the outer end of which is pivoted to a pin, G, that extends through the side of the draw-head and across the compartment E for holding the link F of the opposing draw-head. The inner end of lever H extends beneath the car to a curved guide, $d$.

On the end of the car is a slide rod, K, fitted in boxes L, for turning and end movement, and provided at its ends with handles M, which, being near the sides of the car, are in convenient position for use. On rod K is fixed a strap, N, which is bent to extend beneath the car, and has its end formed with a yoke, $e$, through which the lever H passes. The lever is slotted, and a pin, $f$, (shown most clearly in Fig. 4,) passes through the yoke $e$ and slot of the lever, so that when rod K is moved endwise the lever is operated by this connection. The rod K is provided with lugs $g\ g$, which take against the boxes L when the handles M are turned downward, and thus lock the rod against endwise movement. The boxes, as shown most clearly in Fig. 5, are slotted to allow the lugs to pass when the rod is turned to its operative position, and the boxes are also formed with shoulders $h$, against which the lugs $g$ take when the handles are raised, so that the rod is stopped in proper position with the lugs in front of the slots. With this construction convenient means are provided for moving the pin G in and out of the draw-head.

Either or both links F may be engaged; but in general only one is utilized at a time, as most convenient, and in case the link in use should break there will always be another in reserve and in position for instant use.

Apertured lugs $i$ are provided on the draw-head, above and below the pin G, for receiving a cross-pin to lock the coupling-pin in case the lever H should break.

Having thus described my invention, I claim as new and desire to secure by Letters Patent—

1. The combination, with the sliding rod K and the coupling-pin G, of the bent and slotted lever H, the bent strap N, secured to the said slide-rod, and provided with the yoke $e$, and the pin $f$, substantially as and for the purpose set forth.

2. The combination, with the sliding rod K and the coupling-pin G, of the bent and slotted lever H, the bent strap N, secured to the sliding rod, and provided with yoke e, the pin f, and the curved guide d, substantially as and for the purpose set forth.

3. The combination, with the sliding rod K, provided with lugs g, of the slotted boxes L, provided with the shoulders h, substantially as herein shown and described, whereby the lugs on the rod are made to register with the slots of the boxes, as set forth.

LEANDER KING.

Witnesses:
K. B. FEE,
E. B. PARKER.